(12) United States Patent
Samoto

(10) Patent No.: US 7,549,714 B2
(45) Date of Patent: Jun. 23, 2009

(54) IMAGE RECORDING APPARATUS AND CARRIAGE WITH ADJUSTABLE RECORDING HEAD SUPPORTING POINTS

(75) Inventor: Kenji Samoto, Inuyama (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1057 days.

(21) Appl. No.: 10/661,545

(22) Filed: Sep. 15, 2003

(65) Prior Publication Data

US 2004/0061911 A1   Apr. 1, 2004

(30) Foreign Application Priority Data

Sep. 30, 2002   (JP) ............... 2002-287094

(51) Int. Cl.
*B41J 25/308* (2006.01)
*B41J 23/14* (2006.01)
(52) U.S. Cl. ............................. 347/8; 347/37
(58) Field of Classification Search ............ 347/8, 347/37; 400/55, 59
See application file for complete search history.

(56) References Cited

U.S. PATENT DOCUMENTS

| | | | | |
|---|---|---|---|---|
| 4,514,100 A * | 4/1985 | LaSpesa | ............... | 400/55 |
| 5,510,815 A * | 4/1996 | Linder et al. | ............... | 347/8 |
| 5,870,114 A * | 2/1999 | Numata et al. | ............... | 347/16 |
| 5,880,757 A * | 3/1999 | Ta | ............... | 347/40 |
| 5,988,784 A * | 11/1999 | Takemura et al. | ............... | 347/8 |
| 6,250,731 B1 * | 6/2001 | Hashimoto | ............... | 347/8 |
| 6,450,612 B2 * | 9/2002 | Igarashi et al. | ............... | 347/37 |
| 6,554,394 B1 * | 4/2003 | Yamaguchi et al. | ............... | 347/37 |
| 6,644,765 B2 * | 11/2003 | Lim | ............... | 347/8 |
| 6,663,302 B2 * | 12/2003 | Kelley et al. | ............... | 347/8 |
| 6,666,537 B1 * | 12/2003 | Kelley et al. | ............... | 347/8 |
| 7,005,293 B2 * | 2/2006 | DaQuino et al. | ............... | 347/19 |
| 2002/0126169 A1 * | 9/2002 | Wyngaert et al. | ............... | 347/37 |
| 2004/0012652 A1 * | 1/2004 | Hendricks | ............... | 347/37 |

FOREIGN PATENT DOCUMENTS

| | | |
|---|---|---|
| CN | 1184035 A | 6/1998 |
| JP | A 62-227677 | 10/1987 |
| JP | A 8-258369 | 10/1996 |
| JP | A 8-290564 | 11/1996 |
| JP | A 10-29315 | 2/1998 |
| JP | A 2002-205439 | 7/2002 |
| JP | A 2003-266858 | 9/2003 |

* cited by examiner

*Primary Examiner*—Matthew Luu
*Assistant Examiner*—Shelby Fidler
(74) *Attorney, Agent, or Firm*—Oliff & Berridge, PLC

(57) ABSTRACT

A carriage for supporting a recording head such that a clearance is present between the recording head supported by the carriage, and a recording medium supported by a supporting surface of a medium supporting member, the carriage being reciprocated in a reciprocating direction intersecting a feeding direction in which the recording medium is fed, the carriage including a plurality of supporting portions having respective supporting points where the supporting portions engage and support the recording head, and one or more adjusting devices which moves or move the supporting point or points of one or more of the supporting portions toward, and away from, the recording medium, so as to adjust a degree of parallelism between the recording head and the recording medium with respect to the feeding direction.

26 Claims, 11 Drawing Sheets

FIG. 11A
PRIOR ART
FIG. 11B
PRIOR ART
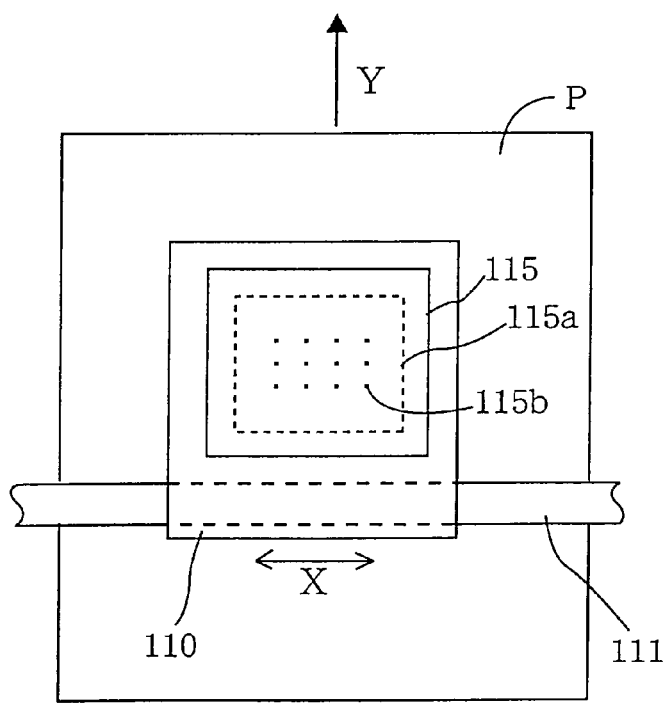
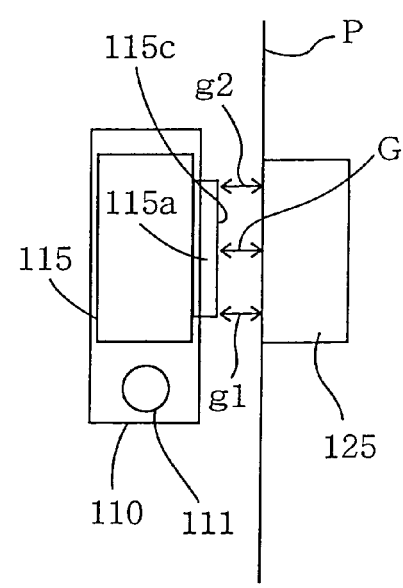

IMAGE RECORDING APPARATUS AND CARRIAGE WITH ADJUSTABLE RECORDING HEAD SUPPORTING POINTS

BACKGROUND OF THE INVENTION

1. Field of the Invention

The present invention generally relates to a carriage and an image recording apparatus such as a printer apparatus, a facsimile apparatus, or a copying apparatus, and particularly to such a carriage which allows a position of a recording head to be so adjusted that a recording surface of the head extends parallel to a path along which a recording medium is fed, and an image recording apparatus including such a carriage.

2. Discussion of Related Art

In the above-indicated image recording apparatus, if an actual distance between a recording surface of, e.g., an ink-jet-type recording head including nozzles, and a recording medium is largely deviated from a designed distance, actual positions where inks outputted from the nozzles are applied to the recording medium are also deviated, which leads to lowering the quality of recording of image. This is also true with dot-impact-type recording heads. This problem has been dealt with by a method disclosed by Japanese Patent Publication No. 62-227677 in which a carriage is supported by an eccentric support bar, and a distance between a recording head and a recording medium is adjusted by appropriate rotation of the eccentric support bar. This method has also been employed by an ink-jet-type recording apparatus, such that a carriage carrying an ink-jet recording head is moved as a whole to adjust a distance between the recording head (i.e., a recording surface thereof) and a recording medium.

FIGS. 11A and 11B show a recording portion of a conventional ink-jet recording apparatus. The recording portion includes a guide bar 111; a carriage 110 that can be reciprocated along the guide bar 111; a recording head 115 mounted on the carriage 110; and a platen 125 for supporting a recording medium, P. The recording head 115 includes a nozzle portion 115a including arrays of nozzles 115b arranged in a recording-medium feeding direction, indicated at Y in FIG. 11A, in which the recording medium P is fed, and also arranged in an image-recording direction, indicated at X, in which the head 115 is moved by the carriage 110 to record an image on the medium P. Each array of nozzles arranged in the feeding direction Y output a same color ink; and each array of nozzles arranged in the recording direction X output different color inks. In this recording portion, regarding the recording direction X, a height position (i.e., an inclination) of the guide bar 111 (as seen in a direction perpendicular to the sheet of FIG. 11A) is so adjusted that respective distances between each of opposite ends of the recording head 115 (i.e., the recordings surface thereof) and the recording medium are equal to each other.

Meanwhile, nozzles that output a same color ink can be arranged in an array with a considerably high density, but difficulty to mount, on a recording head, an increased number of drive devices that drive an increased number of nozzles is increased. Therefore, even if nozzles are arranged with a high density so that a high-density recording can be completed at an increased recording speed, e.g., by just one-time movement of the recording head in the recording direction X, a length of the recording head in the feeding direction Y is not increased, i.e., is considerably short.

If the length of the recording head in the feeding direction Y is short, the quality of recording of image is not influenced by inclination of the recording surface (i.e., so-called "nozzle" surface) of the recording head with respect to the feeding direction Y. More specifically described, if the length of the recording head in the feeding direction Y is short, a clearance, G, between the nozzle surface and the recording medium P is free of a problem that a difference of respective clearances, g1 and g2, between each of opposite ends of the nozzle surface and the recording medium P is excessively large. Thus, the quality of recording of image is not adversely influenced, and accordingly it is not needed to adjust the inclination of the nozzle surface with respect to the feeding direction Y In other words, regarding the inclination of the nozzle surface with respect to the feeding direction Y, the quality of recording of image is maintained by the improved accuracy of dimensions of parts of the recording head.

On the other hand, when recording, in particular, a low-density recording is performed at a higher speed, it is advantageous to use a recording head having an increased number of nozzles arranged at an appropriate regular interval in the feeding direction Y, i.e., a recording head whose length in the feeding direction Y is large. However, for example, in the case where the length of the recording head in the feeding direction Y is doubled, if the difference of respective clearances g1, g2 between each of the upstream and downstream ends of the nozzle surface and the recording medium P is dealt with by the above-described conventional manner, the difference is also doubled. To avoid this problem, it is needed to further improve the accuracy of dimensions of parts of the recording head and more strictly control the manufacturing of those parts. This leads to increasing the overall cost to produce the recording head. There might be an alternative method in which when the recording apparatus is assembled, the guide bar and/or other parts are so adjusted that the nozzle surface extends parallel to the recording medium P. However, this method would require a complicated adjusting and positioning device.

SUMMARY OF THE INVENTION

It is therefore an object to provide a carriage which has a simple construction that assures that a degree of parallelism between a recording surface of a recording head mounted thereon and a recording medium can be easily adjusted, and an image recording apparatus including such a carriage.

(1) A carriage for supporting a recording head such that a clearance is present between the recording head supported by the carriage, and a recording medium, the carriage being reciprocated in a reciprocating direction intersecting a feeding direction in which the recording medium is fed, the carriage comprising a plurality of supporting portions having respective supporting points where the supporting portions engage and support the recording head; and at least one adjusting device which moves the supporting point of at least one of the supporting portions toward, and away from, the recording medium, so as to adjust a degree of parallelism between the recording head and the recording medium with respect to the feeding direction. The recording medium may be supported by a supporting surface of a recording-medium supporting member such as a platen. The supporting surface may be a planar supporting surface. Thus, the clearance present between the recording head and the recording medium can be expressed as a clearance present between the recording head and the supporting surface (preferably, the planar supporting surface) of the recording-medium supporting member. This is also true with each of the features (10) and (19), described later. The clearance present between the recording head and the recording medium may be changed depending upon a thickness of the recording medium.

According to the feature (1), the degree of parallelism can be effectively adjusted with the simple arrangement of the carriage. Therefore, it is not needed to strictly control the accuracy of dimensions of parts of a recording portion and/or parts around a platen. This largely contributes to increasing the yields of those parts, lowering the criteria of inspection of the same, and decreasing the cost to product the same. In addition, when the carriage is subjected to maintenance check, too, the degree of parallelism between the recording head and a recording medium can be easily adjusted.

(2) The carriage according to the feature (1), wherein the supporting portions comprise two upstream supporting portions and one downstream supporting portion with respect to the feeding direction, and wherein the adjusting device moves the supporting point of the downstream supporting portion.

According to the feature (2), the degree of parallelism between the recording head and the recording medium can be easily adjusted by operating the single adjusting device. Thus, the total number of steps needed to adjust the carriage when it is produced, can be reduced.

(3) The carriage according to the feature (1), wherein the supporting portions comprise one upstream supporting portion and two downstream supporting portions with respect to the feeding direction, and wherein the carriage comprises two adjusting devices which move the respective supporting points of the two downstream supporting portions.

According to the feature (3), since the two adjusting devices are operated to adjust the two downstream supporting portions, respectively, the degree of parallelism between the recording head and the recording medium with respect to not only the feeding direction but also the reciprocating direction can be easily adjusted.

(4) The carriage according to the feature (1), wherein the carriage has a head accommodating space which accommodates the recording head such that the head is detachable from the carriage and which opens toward a front side of the carriage, and wherein the supporting portions comprise at least one front supporting portion provided in the space, near to the front side of the carriage, and at least one rear supporting portion provided in the space, remote from the front side of the carriage.

According to the feature (4), since the supporting portions comprise the front supporting portion provided in the head accommodating space, near to the front opening of the space and the rear supporting portion provided in the space, remote from the front opening, the adjusting device is provided in the space, at a position near to, or remote from, the front opening of the space. Thus, the adjusting device can be easily operated.

(5) The carriage according to the feature (1) or (3), wherein the carriage comprises a plurality of adjusting devices which move, independent of each other, the respective supporting points of the supporting portions.

According to the feature (5), since the plurality of supporting portions are adjusted, independent of each other, by the plurality of adjusting devices, respectively, the degree of parallelism between the recording head and the recording medium can be easily adjusted with respect to not only the feeding direction but also the reciprocating direction. Thus, this feature is particularly advantageous to the adjustment of a recording head whose nozzle portion is wide in the reciprocating direction or a recording head having nozzles that output different color inks. That is, the quality of recording of image can be improved.

(6) The carriage according to the feature (3), wherein the two adjusting devices simultaneously move the respective supporting points of the two downstream supporting portions.

According to the feature (6), both of the two downstream supporting portions are adjusted by a single operation of the two adjusting devices. Thus, when the supporting portions need re-adjustment, the re-adjustment can be easily performed.

(7) The carriage according to any of the features (1) to (6), wherein the adjusting device adjusts a height position of the supporting point of the at least one supporting portion.

According to the feature (7), the clearance present between the recording head and the recording medium is adjusted by upward and/or downward movement of the recording head by the adjusting device. Therefore, the adjustment can be easily performed without needing to remove components provided in bottom and/or rear portions of a recording apparatus, such as a platen.

(8) The carriage according to the feature (7), wherein the adjusting device comprises a cam which is for adjusting the height position of the supporting point of the at least one supporting portion where the at least one supporting portion engages and supports the recording head. The cam may be an eccentric cam.

According to the feature (8), since the radius of the cam finely and continuously changes in the circumferential direction thereof, the height position of the supporting point of the supporting portion, i.e., the degree of parallelism between the recording head and the recording medium can be finely and continuously adjusted. In the case where the cam is an eccentric cam, it can be easily produced.

(9) The carriage according to the feature (7), wherein the adjusting device comprises a screw which is rotatable for adjusting the height position of the supporting point of the at least one supporting portion where the at least one supporting portion engages and supports the recording head.

According to the feature (9), since the adjusting device is provided by a screw, the construction of the adjusting device can be simplified and accordingly the total number of parts needed can be reduced, which leads to decreasing the total cost to produce the carriage.

(10) A carriage for supporting a recording head such that a clearance is present between the recording head supported by the carriage, and a recording medium, the carriage being reciprocated in a reciprocating direction intersecting a feeding direction in which the recording medium is fed, the carriage comprising a plurality of supporting portions having respective supporting points where the supporting portions engage and support the recording head; and at least one adjusting device which moves the supporting point of at least one adjustable supporting portion of the supporting portions toward, and away from, the recording medium, the supporting portions further comprising at least one stationary supporting portion whose supporting point is stationary, the at least one adjustable supporting portion being provided at a downstream position in the feeding direction so as to define a downstream clearance between a downstream portion of the recording head and the recording medium, the at least one stationary supporting portion being provided at an upstream position in the feeding direction so as to define an upstream clearance between an upstream portion of the recording head and the recording medium, the at least one adjusting device moving the supporting point of the at least one adjustable supporting portion and thereby adjusting the downstream clearance between the downstream portion of the recording head and the recording medium.

According to the feature (10), the degree of parallelism can be effectively adjusted with the simple arrangement of the carriage. Therefore, it is not needed to strictly control the accuracy of dimensions of parts of a recording portion and/or parts around a platen. This largely contributes to increasing the yields of those parts, lowering the criteria of inspection of the same, and decreasing the cost to product the same. In addition, when the carriage is subjected to maintenance check, too, the degree of parallelism between the recording head and a recording medium can be easily adjusted.

(11) The carriage according to the feature (10), further comprising two side plates which extend perpendicularly to the reciprocating direction and cooperate with each other to define a head accommodating space to accommodate the recording head; and a support bar which extends, at the downstream position in the feeding direction, perpendicularly to the two side plates and has opposite end portions that are respectively supported by the two side plates, wherein the support bar supports the at least one adjustable supporting portion and the at least one adjusting device which moves the supporting point of the at least one adjustable supporting portion and thereby adjusts the downstream clearance between the downstream portion of the recording head and the recording medium.

According to the feature (11), the support bar increases a rigidity of the carriage, thereby assuring that the carriage can strongly support the recording head. In addition, the once adjusted degree of parallelism between the recording head and the recording medium can be stably maintained.

(12) The carriage according to the feature (11), further comprising two reinforcing plates which are fixed to the two side plates, respectively, and cooperate with each other to support the support bar.

According to the feature (12), the reinforcing plates further increases the rigidity of the carriage, thereby assuring that the carriage can more strongly support the recording head. In addition, the once adjusted degree of parallelism between the recording head and the recording medium can be more stably maintained.

(13) The carriage according to any of the features (10) to (12), wherein the carriage comprises two upstream stationary supporting portions and one downstream adjustable supporting portion with respect to the feeding direction.

According to the feature (13), the degree of parallelism between the recording head and the recording medium can be easily adjusted by operating the single adjusting device. Thus, the total number of steps needed to adjust the carriage when it is produced, can be reduced.

(14) The carriage according to the feature (13), wherein the two upstream stationary supporting portions are provided in vicinity of the two side plates, respectively, and the one downstream adjustable supporting portion is provided at a substantially middle position between the two side plates.

According to the feature (14), the three supporting portions cooperate with each other to define an isosceles triangle, and the adjusting device is provided at the top vertex of the isosceles triangle. Thus, the recording head can be supported and adjusted in a well-balanced fashion.

(15) The carriage according to any of the features (10) to (12), wherein the carriage comprises one upstream stationary supporting portion and two downstream adjustable supporting portions with respect to the feeding direction.

According to the feature (15), since the two adjusting devices are operated to adjust the two supporting portions, respectively, the degree of parallelism between the recording head and the recording medium can be adjusted with respect to not only the feeding direction but also the reciprocating direction, i.e., in a widthwise direction of the recording head. Thus, this feature is particularly advantageous to a recording head that is wide in the reciprocating direction.

(16) The carriage according to the feature (15), wherein the one upstream stationary supporting portion is provided at a substantially middle position between the two side plates, and the two downstream adjustable supporting portions are provided in vicinity of the two side plates, respectively.

According to the feature (16), the three supporting portions cooperate with each other to define an isosceles triangle, the one stationary supporting portion is provided at the top vertex of the isosceles triangle, and the two adjusting devices are provided at the other two vertices of the triangle, respectively. Thus, the recording head can be supported and adjusted in a well-balanced fashion.

(17) The carriage according to any of the features (11) to (16), wherein the at least one adjusting device comprises a cam which is supported by the support bar, and wherein the supporting point of the at least one adjustable supporting portion comprises an outer circumferential surface of the cam.

According to the feature (17), since the radius of the cam finely and continuously changes in the circumferential direction thereof, the height position of the supporting point of the supporting portion, i.e., the degree of parallelism between the recording head and the recording medium can be finely and continuously adjusted. In the case where the cam is an eccentric cam, it can be easily produced.

(18) The carriage according to any of the features (11) to (16), wherein the at least one adjusting device comprises a screw which is screwed in a hole of the support bar such that the screw is movable in the hole of the support bar, and wherein the supporting point of the at least one adjustable supporting portion comprises an end surface of the screw.

According to the feature (18), since the adjusting device is provided by a screw, the construction of the adjusting device can be simplified and accordingly the total number of parts needed can be reduced, which leads to decreasing the total cost to produce the carriage.

(19) A carriage for supporting a recording head such that a clearance is present between the recording head supported by the carriage, and a recording medium, the carriage being reciprocated along a guide bar in a reciprocating direction intersecting a feeding direction in which the recording medium is fed, the carriage comprising at least one through-hole through which the guide bar extends; a plurality of supporting portions having respective supporting points where the supporting portions engage and support the recording head, and comprising at least one hole-side supporting portion provided on a side of the at least one through-hole and at least one opposite-side supporting portion that is opposite to the at least one hole-side supporting portion with respect to the recording head; and at least one adjusting device which moves the supporting point of at least one of the supporting portions toward, and away from, the recording medium, so as to adjust a degree of parallelism between the recording head and the recording medium with respect to the feeding direction.

According to the feature (19), the degree of parallelism can be effectively adjusted with the simple arrangement of the carriage. Therefore, it is not needed to strictly control the accuracy of dimensions of parts of a recording portion and/or parts around a platen. This largely contributes to increasing the yields of those parts, lowering the criteria of inspection of the same, and decreasing the cost to product the same. In addition, when the carriage is subjected to maintenance check, too, the degree of parallelism between the recording head and a recording medium can be easily adjusted.

(20) The carriage according to the feature (19), wherein the supporting portions comprise two hole-side supporting portions provided on the side of the at least one through-hole, and one opposite-side supporting portion opposite to the two hole-side supporting portions with respect to the recording head, and wherein the adjusting device moves the supporting point of the one opposite-side supporting portion.

According to the feature (20), the degree of parallelism between the recording head and the recording medium can be easily adjusted by operating the single adjusting device. Thus, the total number of steps needed to adjust the carriage when it is produced, can be reduced.

(21) The carriage according to the feature (19), wherein the supporting portions comprise one hole-side supporting portion provided on the side of the at least one through-hole, and two opposite-side supporting portions opposite to the one hole-side supporting portion with respect to the recording head, and wherein the carriage comprises two adjusting devices which move the respective supporting points of the two opposite-side supporting portions.

According to the feature (21), since the two adjusting devices are operated to adjust the two supporting portions, respectively, the degree of parallelism between the recording head and the recording medium can be adjusted with respect to not only the feeding direction but also the reciprocating direction.

(22) An image recording apparatus, comprising the carriage according to any of the features (1) to (21); a guide bar which guides the carriage such that the carriage is reciprocated in the reciprocating direction intersecting the feeding direction in which the recording medium is fed; and a frame which holds the guide bar, supports the carriage, and cooperates with the guide bar to position the carriage relative to the recording medium. The image recording apparatus may further comprise a clearance changing device which changes the clearance present between the recording head and the recording medium, depending upon a thickness of the recording medium.

According to the feature (22), since the image recording apparatus employs the above-described carriage, the apparatus can record an image with a high quality without needing to strictly control the accuracy of dimensions of parts needed.

(23) The image recording apparatus according to the feature (22), wherein the carriage supports the recording head comprising an ink jet recording head which outputs an ink toward the recording medium to record an image on the recording medium.

According to the feature (23), the ink jet recording head outputs the ink toward the recording medium through the clearance present between the recording head and the medium. If the degree of parallelism between the recording head and the recording medium is insufficiently low, inks outputted by nozzles of the head would be applied to deviated positions on the medium, which leads to lowering the quality of recording of image. However, the present apparatus is free of this problem. In addition, the ink-jet-type image recording apparatus needs to be produced at as low as possible cost. However, since the present apparatus assures that the degree of parallelism between the recording head and the recording medium can be adjusted without needing to strictly control the accuracy of relevant parts, the present apparatus can be produced at reduced cost.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 11A is a front elevation view of a recording portion of a conventional image recording apparatus; and FIG. 11B is a side elevation view of the recording portion of FIG. 11A.

DETAILED DESCRIPTION OF THE PREFER EMBODIMENTS

Figure 1:
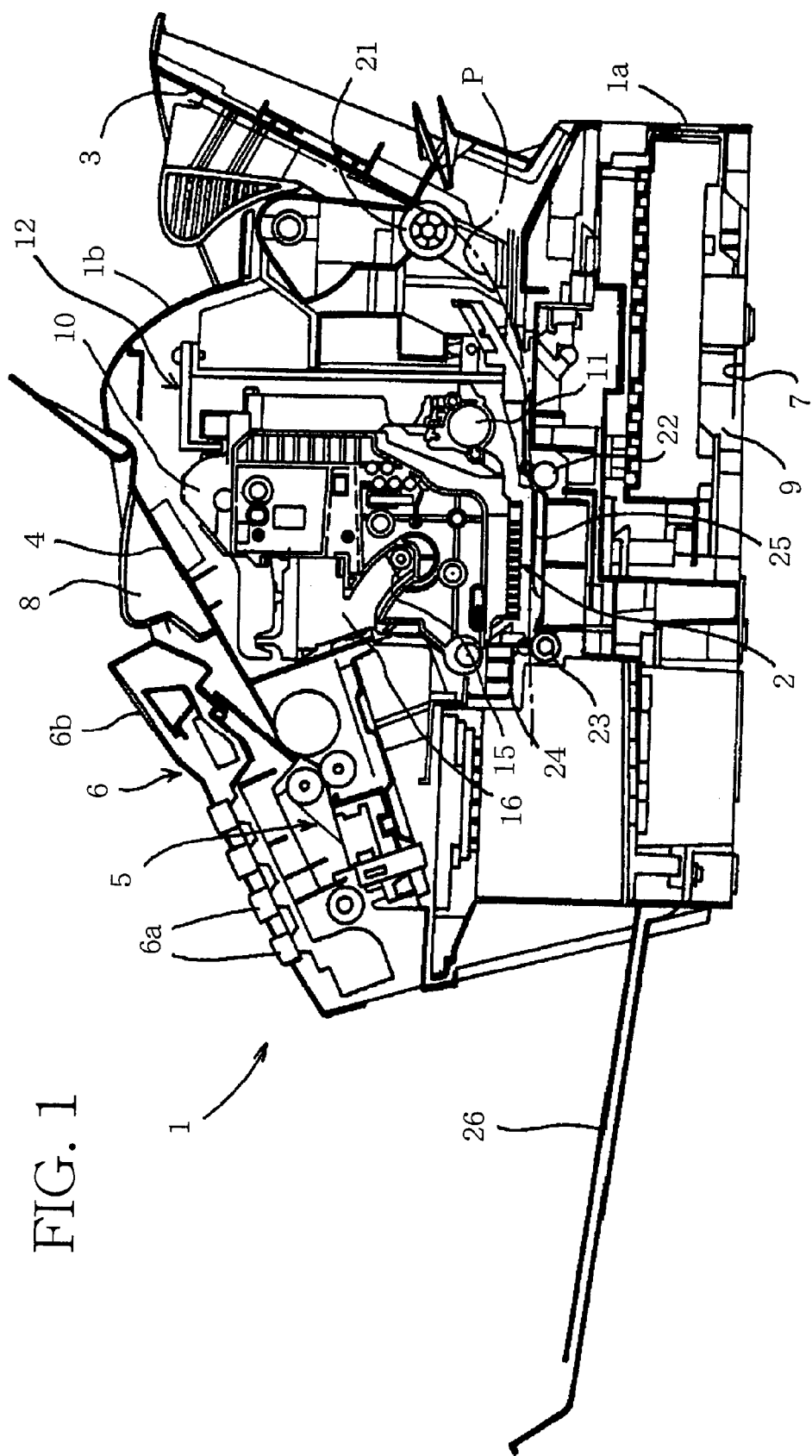
FIG. 1 is a right-hand-side, cross-sectioned elevation view of a printer apparatus as an example of an image recording apparatus to which the present invention is applied, the printer apparatus also functioning as a facsimile apparatus.

Hereinafter, there will be described some embodiments of the present invention by reference to the drawings. FIG. 1 shows a printer apparatus 1 as a sort of image recording apparatus to which the present invention is applied. The printer apparatus 1 also functions as a facsimile apparatus.

The printer apparatus 1, shown in FIG. 1, implements various common facsimile functions, in response to respective operations of various keys provided on an operation panel 6, such as the function of setting various operation modes; the function of reading, with an original reading unit 5, an image on an original; the function of transforming the read image into image data; the function of coding the image data into facsimile data; the function of transmitting, and receiving, facsimile data to, and from, another facsimile apparatus via a communication line such as a telephone line; the function of decoding received facsimile data; and the function of recording, with a recording-head unit 15 of a recording portion, an image represented by the decoded facsimile data, on a recording sheet, P. In addition, the printer apparatus 1 has a copying function of reading, with a CIS (contact-type image sensor) of the original reading unit 5, an image on an original and recording, with the recording-head unit 15, a color image on a recording sheet P; a printing function of receiving image data from an external device such as a personal computer (not shown) via a printer cable, or a wireless communication line such as infrared waves, and recording, on a recording sheet P, an image represented by the received image data; and a scanning function of reading an image using the original reading unit 5, and transmitting image data representing the read image, to the external device.

The printer apparatus 1 includes a body case including a main lower case 1a which is formed of a synthetic resin and accommodates the ink jet type recording portion 2; and an upper case 1b which is also formed of a synthetic resin and covers the lower case 1a. The lower case 1a is equipped, in a rear, top portion thereof, with an inclined supply tray 3 for supplying recording sheets P on each of which an image is to be recorded. The upper case 1b has, in a rear portion thereof, an original supporting portion 4, and accommodates the original reading unit 5 as an original reading portion, in front of the original supporting portion 4. The upper case 1b has, above the original reading unit 5, the operation panel 6 including an operation-key portion 6a having various function keys and numeral keys, and a display portion 6b. The original supporting portion 4 is equipped with a pair of guide members 8 which guide respective side edges of an original being fed.

A bottom surface of the lower case 1a is covered by a cover plate 7 which is formed of, e.g., a metal plate, and an interior space of the lower case 1a accommodates a control portion 9 including a control board, an electric-power board, and an NCU (network control unit) board for transmitting and receiving conversation or facsimile data to and from another telephone set or another facsimile apparatus via a telephone line. In addition, the lower case 1a includes a hand-set support (not shown) which projects outwardly from a side portion thereof and supports a handset (not shown) used by a user for making conversation with another telephone. Moreover, the lower case 1a supports, in a rear portion of a right-hand side wall thereof, a fixed speaker (not shown) for calling or monitoring.

The recording sheets P stacked in the supply tray 3 are fed, one by one, while each one sheet P is separated from the remaining sheets P by a conventionally known sheet supplying device that includes a sheet supplying roller 21 and a sheet separating device (not shown) and is provided in the rear portion of the lower case 1a. If the leading-end edge line of the thus separated sheet P is inclined relative to a direction perpendicular to a feeding direction in which the sheet P is being fed, the posture of the sheet P is once adjusted at a position where a feeding roller 22 is provided, and then is further fed to a clearance present between a lower surface of a carriage 10 and a platen 25. The carriage 10 is mounted on a guide bar 11 having a circular cross section, such that the carriage 10 is slideable on the guide bar 11 and is rotatable about the same 11. While the recording sheet P is pinched, and fed, by upper and lower discharging rollers 23, 24 which are provided in a downstream side of the platen 25, the carriage 10 is moved along the guide bar 11, by a drive motor 19 (FIG. 3) attached to a frame 12 fixed to the body case, a pulley 20 (FIG. 3) fixed to the drive motor 19, and a timing belt 18 (FIG. 3) wound on the pulley 20, and the recording-head unit 15 outputs, according to print commands, inks supplied from ink cartridges 16 onto an upper surface of the recording sheet P so as to record an image thereon. Then, the recording sheet 16 is discharged into an outlet tray 26.

Figure 3:
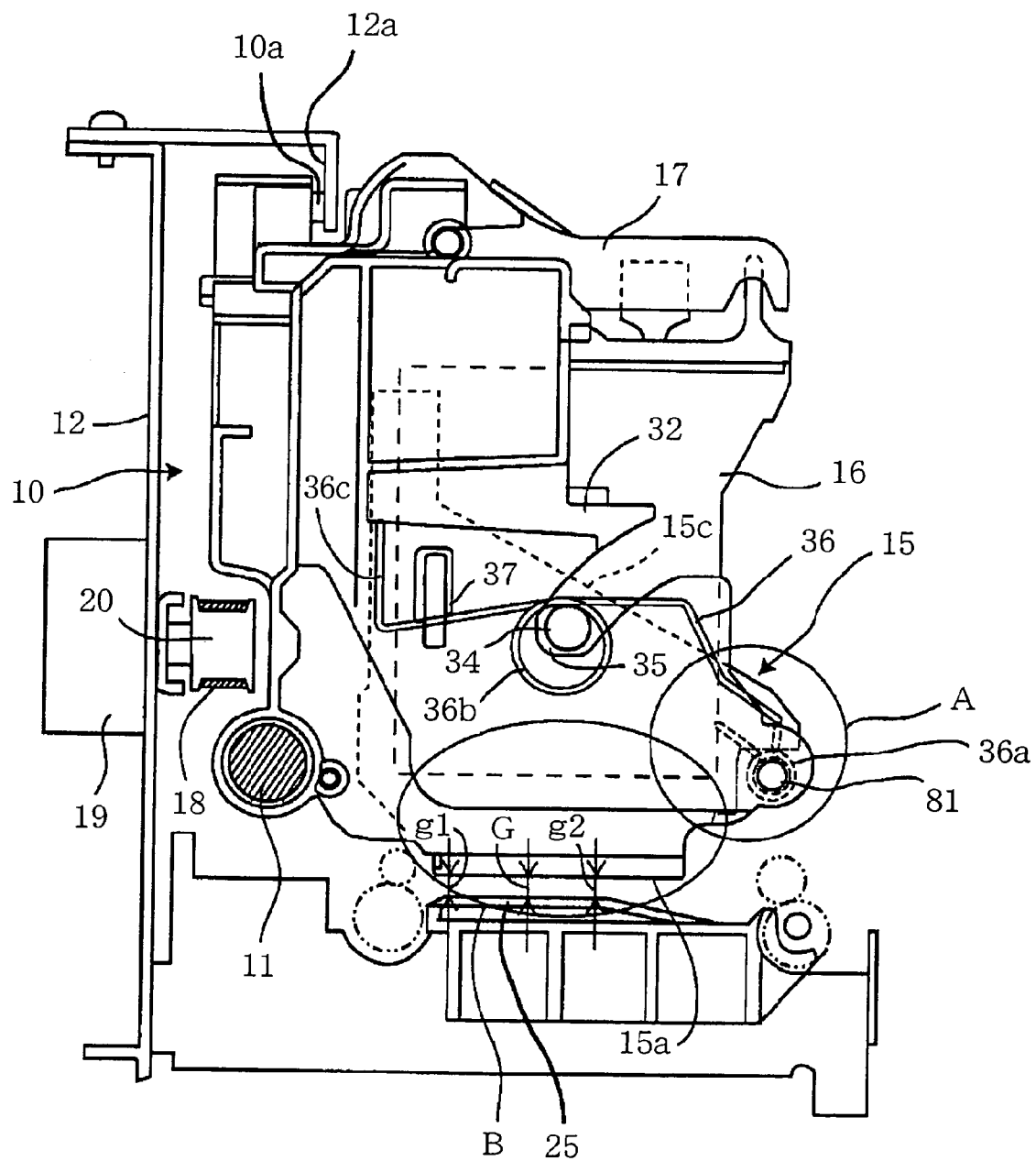
FIG. 3 is a left-hand-side elevation view of a carriage on which a recording-head unit and ink cartridges are mounted.

As shown in FIG. 3, a carriage supporting portion 12a of the frame 12 and a sliding portion 10a of the carriage 10 engage each other so as to define a position (i.e., an angular position) of the carriage 10 relative to the frame 12, or the platen 25. The carriage 10 is moved while the sliding portion 10a thereof slides on the carriage supporting portion 12a of the frame 12.

In the case where a clearance, G, present between the recording-head unit 15 and the recording sheet P as a recording medium needs to be changed according to a thickness of the sheet P, a changing device (not shown) is operated to change an amount of projection of the sliding portion 10a.

Figure 8A:
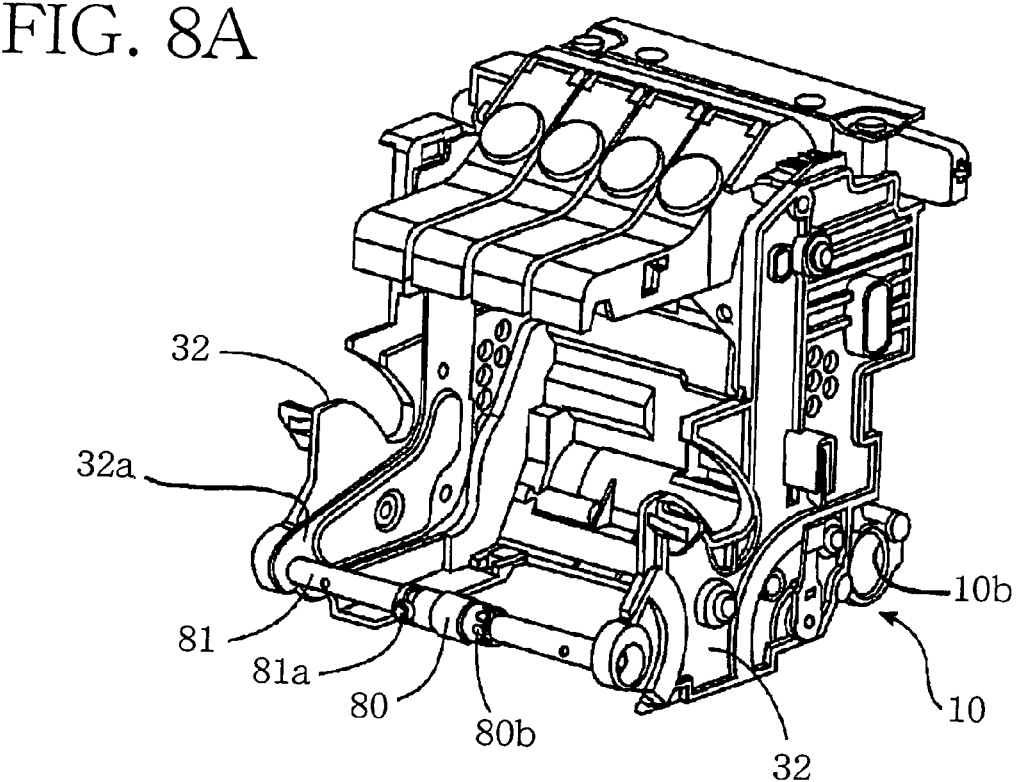
FIG. 8A is a perspective view of a clearance adjusting device of the printer apparatus.

As shown in FIG. 8A, the carriage 10 of the recording portion 2 has, in a lower, rear end portion thereof, a bar through-hole 10b through which the guide bar 11 parallel to the frame 12 extends. Thus, the carriage 10 is slideable on the guide bar 11 in a direction parallel to the frame 12, and is rotatable about the same 11. In addition, as shown in FIG. 3, the timing belt 18 extending parallel to the guide bar 11 is wound on a driven pulley (not shown) provided at a position near to one end of the frame 12, and the drive pulley 20 fixed to an output bar of the drive motor 19 such as a DC motor that can be rotated forward and backward. Since the carriage 10 is connected to a portion of the timing belt 18, the carriage 10 can be reciprocated in directions parallel to the guide bar 11.

Figure 2:
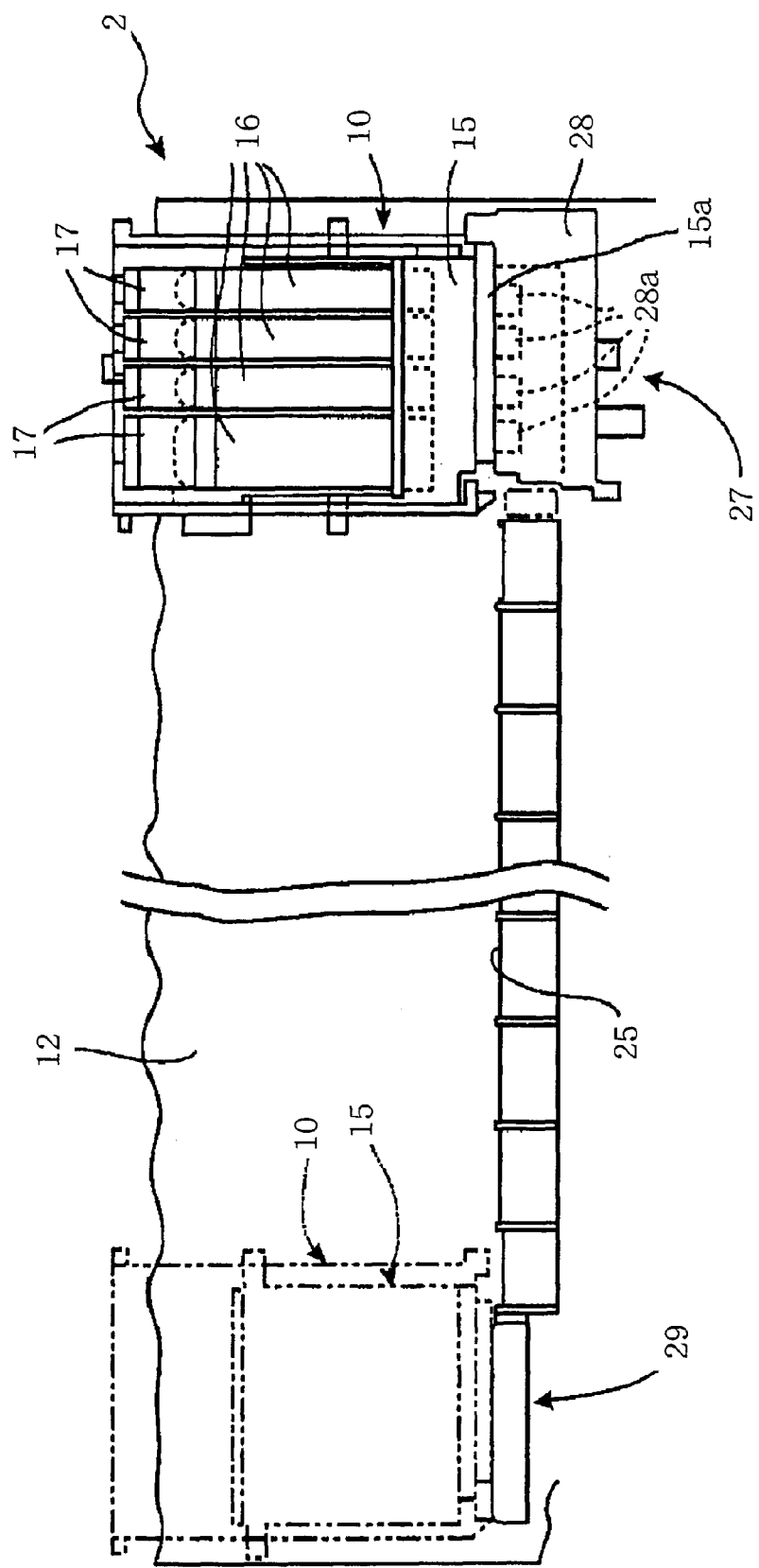
FIG. 2 is a front elevation view of a recording portion of the printer apparatus.

Next, a printing operation of the carriage 10 will be briefly described by reference to FIG. 2. A maintenance portion 27 is provided, on a right-hand side of the platen 25, at a position near to an end of movement of the carriage 10, beyond a recording area of the recording-unit head 15. The maintenance portion 27 includes a nozzle cleaning device (e.g., a wiper device, not shown) for cleaning inks adhered to an outer surface of a nozzle portion 15a of the recording-head unit 15, and a purging device (e.g., a suction device) 28 for purging inks clogging the nozzles of the nozzle portion 15a and thereby recovering the ink-outputting function of the same 15. The purging device 28 includes suction caps 28a for covering the respective nozzles of the nozzle portion 15a, and a pump (not shown) for applying a negative pressure to the inks clogging the nozzles and thereby removing the inks from the nozzles. The purging device 28 as part of the maintenance portion 27 is provided at a home position of the carriage 10 (i.e., at a right-hand end of movement of the carriage 10, shown in FIG. 2), and also functions as a capping device (i.e., a drying preventing device) for covering all the nozzles of the nozzle portion 15a of the recording-head unit 15 and thereby preventing drying of the inks in the nozzles. That is, the suction caps 28a also function as drying preventing caps. A flushing portion 29 is provided on a left-hand side of the platen 25. In the flushing portion 29, the color-image recording-head unit 15 is operated to output an ink from each of the nozzles of the nozzle portion 15a, for the purpose of preventing the ink from clogging the each nozzle.

Figure 6:
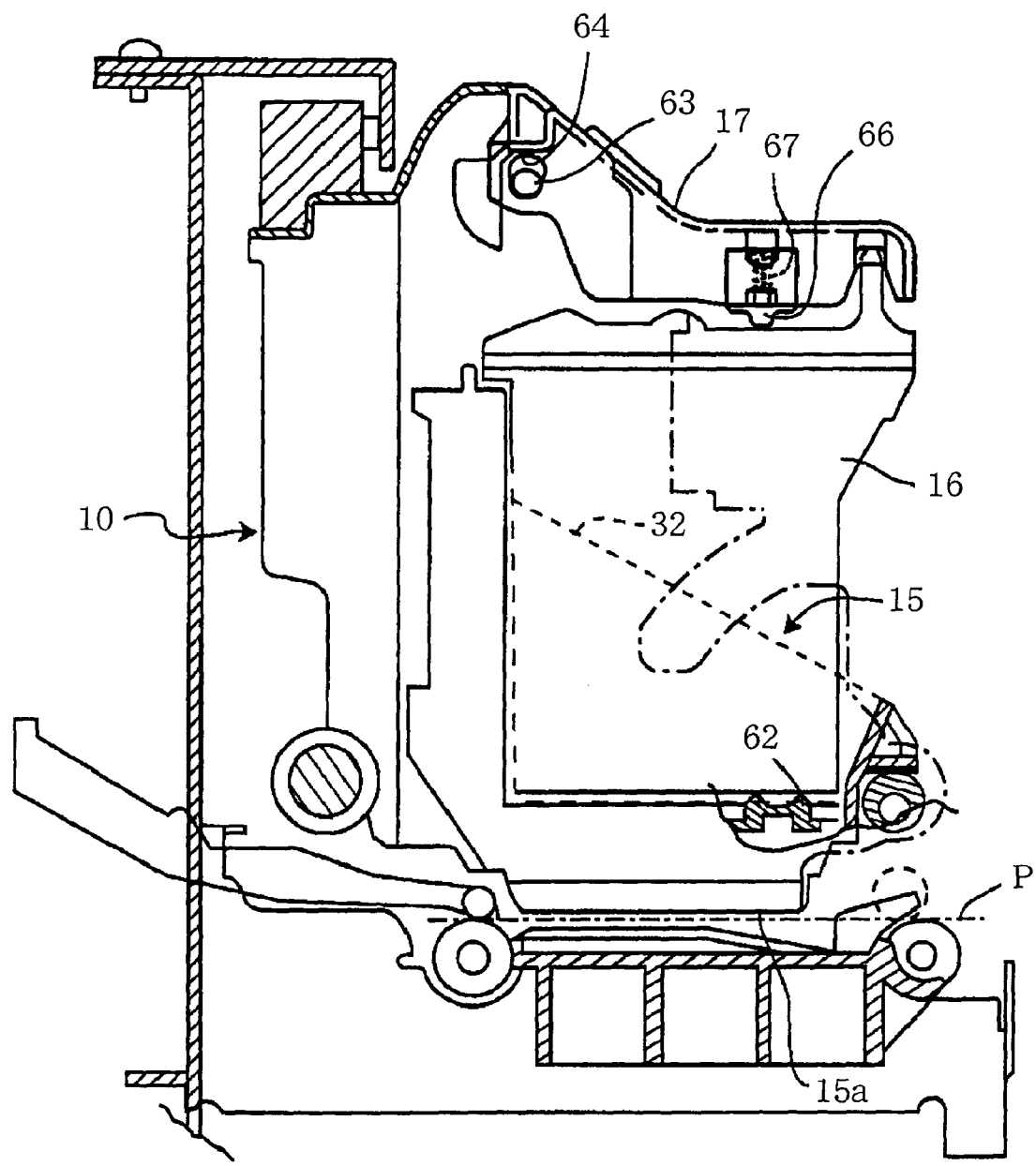
FIG. 6 is a left-hand-side, cross-sectioned elevation view of the carriage with the ink cartridges being cross-sectioned.

Next, there will be described the construction of the recording portion 2. As shown in FIGS. 2, 3, and 6, the recording-head unit 15 that is of color ink jet type and of cartridge type is detachably attached to the carriage 10, such that the nozzle portion 15a of the head unit 15 faces downward. The nozzle portion 15a of the color-image recording-head unit 15 has four groups of nozzles that output cyan, yellow, magenta, and black color inks, respectively, and the four ink cartridges 16 stores the four color inks, respectively, and supply the four color inks to the four groups of nozzles of the nozzle portion 15a, respectively. The ink cartridges 16 are detachably attached to an upper surface of the recording-head unit 15. The carriage 10 has, in an upper end portion thereof, four hold-down levers 17 each of which is pivotable to a horizontal, operative position in which the each lever 17 holds down the corresponding ink cartridge 16 and to an inclined or vertical, inoperative position where the each lever 17 allows the corresponding ink cartridge 16 to be attached or detached to or from the head unit 15.

As shown in FIG. 3, the recording-head unit 15 is mounted on the carriage 10 such that the head unit 15 is oriented downward. To this end, since a spring-support pin 34 projects laterally from a generally central portion of each of right-hand and left-hand side plates 15c of the head unit 15, the two spring-support pins 34 of the head unit 15 are obliquely guided by respective inclined recesses 35 formed in respective generally central portions of right-hand and left-hand side plates 32 of the carriage 10. Respective front end portions of the right-hand and left-hand side plates 32 of the carriage 10 are connected to each other by a support bar 81. In addition, two wire springs 36, each as a sort of elastic pressing member, that are formed of, e.g., metal are connected, at respective coiled base end portions 36a thereof, to opposite end portions of the support bar 81, inside the two side plates 32 of the carriage 10, such that the coiled base end portions 36a are rotatable about the support bar 81 (only the left-hand wire spring 36 is shown in FIG. 3). Each of the two wire springs 36 includes a coiled hold-down portion 36b that is engaged with the corresponding spring-support pin 34 projecting outward from the corresponding side plate 32 of the carriage 10. If, in this state, a free end 36c of each wire spring 36 is somewhat pressed downward by the user and then is engaged with an engaging portion 37 of the corresponding side plate 32 such that the wire spring 36 is not movable upward, a downward pressing force is applied to the spring-support pin 34 of the head unit 15, so that an appropriate downward load is applied to the head unit 15 accommodated in the carriage 10. Thus, the head unit 15 is stably fixed on a plurality of supporting portions of the carriage 10 that will be described later.

Figure 5:
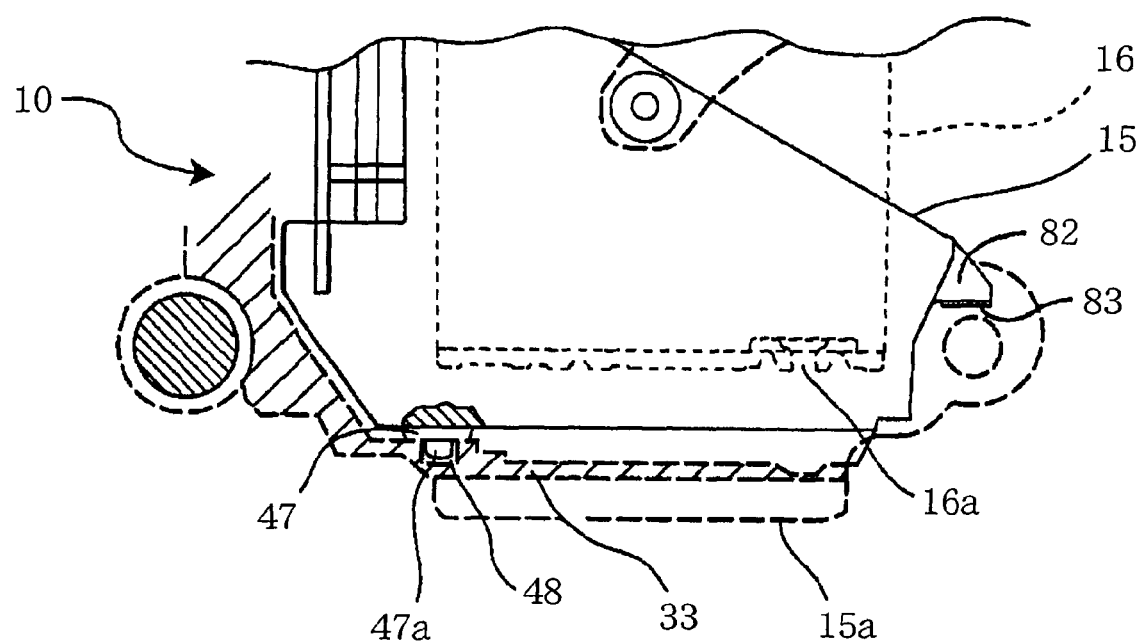
FIG. 5 is an enlarged view of a portion of the carriage, indicated at "B" in FIG. 3.
Figure 7:
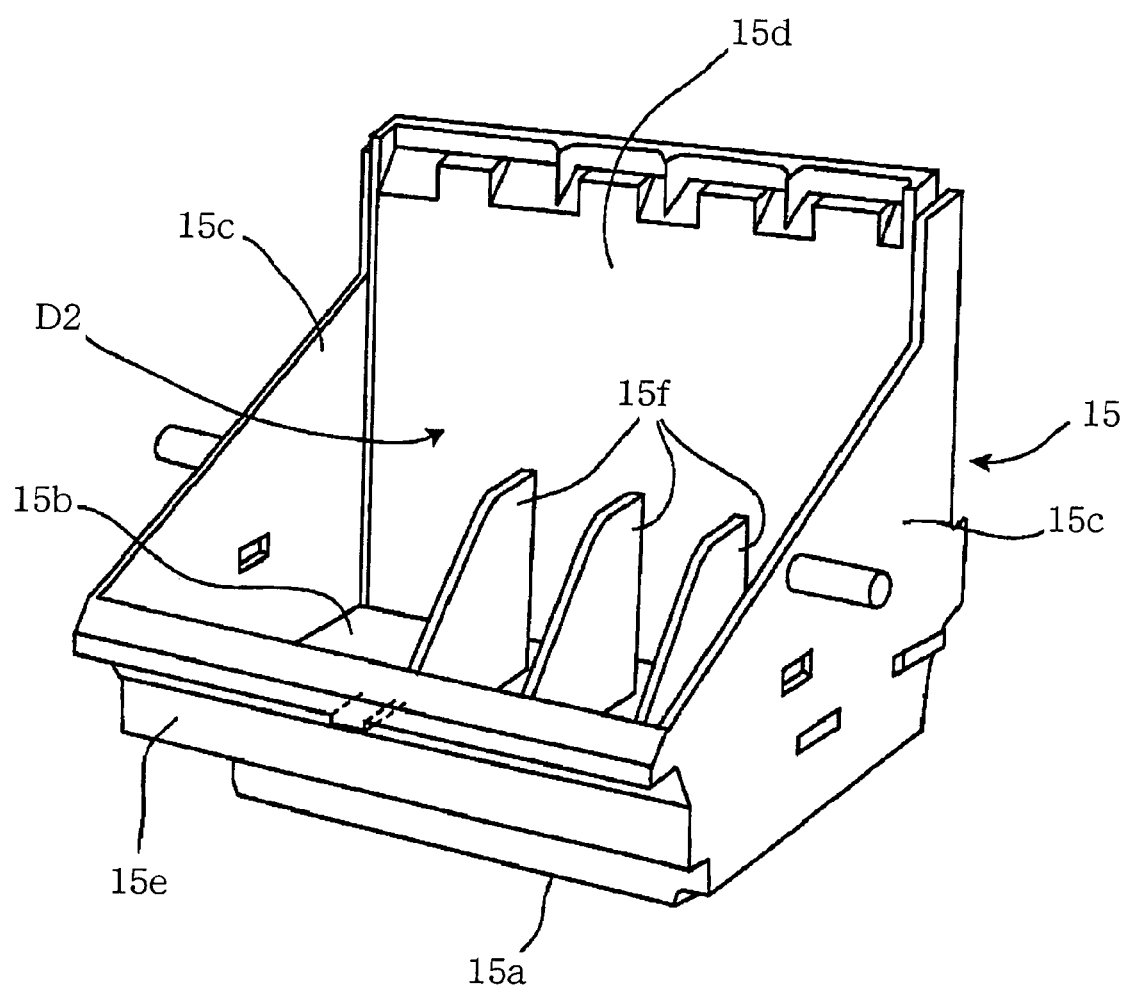
FIG. 7 is a perspective view of the recording-head unit.

As shown in FIG. 7, the nozzle portion 15a of the recording-head unit 15 is provided in a lower surface of a bottom plate 15b, and the bottom plate 15b, the two side plates 15c, a rear plate 15d and a front plate 15e cooperate with each other to define an ink cartridge accommodating portion, D2, that accommodates the ink cartridges 16 (FIG. 3) and opens upward. As shown in FIGS. 5 and 6, the bottom plate 15b has four manifolds 62 that open upward in an upper surface thereof, i.e., open in the ink cartridge accommodating space D2, and are aligned with respective ink outlets 16a opening in respective lower surfaces of the four ink cartridges 16. In addition, three partition plates 15f are provided in the space D2 so that the four ink cartridges 16 are separated from each other.

Figure 9A:
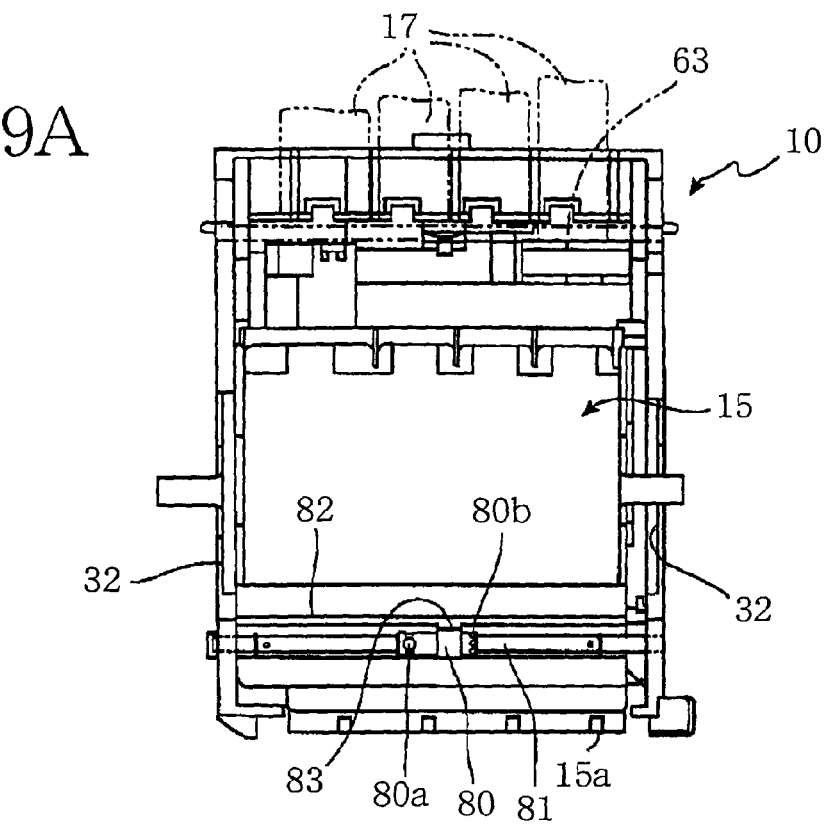
FIG. 9A is a front elevation view of the recording-head unit accommodated in a head accommodating portion of the carriage.

Next, there will be explained an arrangement used for attaching and detaching the ink cartridges 16 to and from the recording-head unit 15. As shown in FIGS. 6 and 9A, a lever-support bar 63 is supported by respective upper end portions of the two side plates 32 of the carriage 10, such that the lever-support bar 63 extends horizontally. Respective base end portions of the four hold-down levers 17 for holding down respective upper surfaces of the four ink cartridges 16 have respective generally inverted-8-shaped holes 64 through which the lever-support bar 63 extends. Thus, each of the four hold-down levers 17 is pivotable about the lever-support bar 63, and is normally biased by a spring, not shown, in an upward direction.

Each hold-down lever 17 has a generally inverted-U-shaped cross section, and a pressing block 66 for pressing downward the upper surface of the corresponding ink cartridge 16 is attached to a lower surface of a free end portion of the each lever 17, such that the pressing block 66 is movable upward and downward and is prevented from coming off the each lever 17. The pressing block 66 is biased downward by a biasing spring 67 which is provided between the pressing block 66 and a top plate of the each lever 17. A pressing point where each of the four pressing blocks 66 presses the corresponding ink cartridge 16 is vertically aligned with the vicinity of the corresponding manifold 62 of the carriage 10. Thus, in the state in which the recording-head unit 15 is fixed by being pressed by the wire springs 36 (FIG. 3), the four hold-down levers 17 hold down the head unit 15 via the ink cartridges 16. Thus, the ink cartridges 16 are suitably attached to, and held by, the head unit 15. In this state, since the nozzle portion 15a of the head unit 15 faces the recording surface of the recording sheet P being positioned below the portion 15a, the head unit 15 can record an image (e.g., characters) on the sheet P.

While the method in which the recording-head unit 15 is attached to the carriage 10 has been briefly described above, there will next be explained in detail the arrangement and method in which one of the supporting portions of the carriage is so adjusted as to adjust a degree of parallelism between the nozzle portion 15a and the platen 25 (or the recording surface of the recording sheet P). This is a first embodiment of the present invention.

As is apparent from the drawings, the carriage 10 employed in the first embodiment opens frontward and upward. Though the hold-down levers 17 are provided in the top portion of the carriage 10, the levers 17 can be pivoted upward about the lever-support bar 63, and accordingly the carriage 10 can open upward as well as frontward. Through the front and top opening of the carriage 10, the recording-head unit 15 is detachably attached to the interior space of the carriage 10. The head unit 15 is accurately positioned, and is stably held, in the frontward and upwardly opening head accommodating space of the carriage 10, as follows: First, as shown in FIG. 3, the respective spring-support pins 34 projecting laterally outward from the left-hand and right-hand side plates 15c of the head unit 15 are inserted in the respective inclined recesses 35 of the left-hand and right-hand side plates 32 of the carriage 10, and then the wire springs 36 are engaged to press the head unit 15 against the carriage 10. Consequently, as shown in FIG. 5, left-hand and right-hand butting portions 47 provided in a rear portion of the bottom surface of the head unit 15 rest on left-hand and right-hand supporting portions 33 provided in a rear portion of the bottom portion of the carriage 10, respectively, while respective positioning projections 47a of the two butting portions 47 fit in respective receiving grooves 48 of the two supporting portions 33. Therefore, the two supporting portions 33 of the rear portion of the bottom wall of the carriage 10 stably support and hold the two butting portions 47 of the rear portion of the bottom wall of the recording-head unit 15, respectively, owing to the biasing force, i.e., downward pressing force of the wire springs 36 (FIG. 3). Thus, a rear-side clearance, g1, between the nozzle portion 15a and the platen 25 is fixedly defined as described previously by reference to FIG. 3.

Figure 4A:
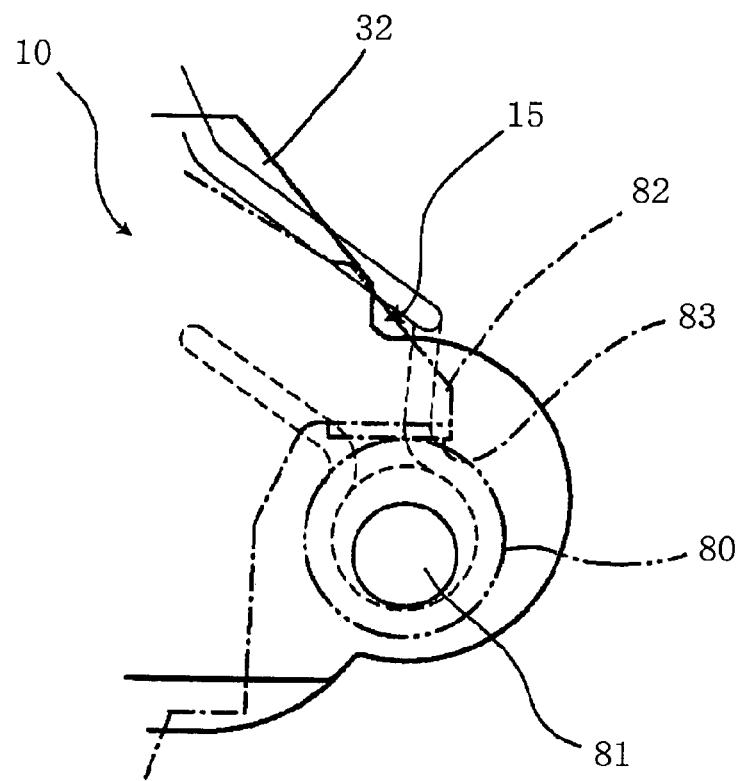
FIG. 4A is an enlarged view of a portion of the carriage, indicated at "A" in FIG. 3.

Next, the arrangement for positioning a front-side portion of the recording-head unit 15, i.e., adjusting a front-side clearance, g2, will be explained. As shown in FIGS. 3 and 4A, a support bar 81 horizontally extends through respective through-holes formed through respective front end portions of the left-hand and right-hand side plates 32 of the carriage 10, and is fixed to the two side plates 32 with respective screws, not shown.

In addition, as shown in FIG. 8A, two reinforcing plates 32a which are formed of, e.g., metal and have a high degree of rigidity are respectively fixed to the left-hand and right-hand side plates 32 with respective screws, not shown. Since the side plates 32 are formed of synthetic resin, the reinforcing plates 32a compensate for the shortage of rigidity of the side plates 32 so that the side plates 32 can support the support bar 81.

As shown in FIGS. 4A, 8A and 9A, the support bar 81 connecting between the two side plates 32 of the carriage 10 supports an eccentric adjusting cam 80 such that the eccentric adjusting cam 80 is eccentric with the bar 81. The eccentric adjusting cam 80 is fixed to the support bar 81 with a fixing screw 80a such as a set screw. The adjusting cam 80 has, in one of axially opposite end portions thereof, a plurality of grooves 80b. If the fixing screw 80a is loosened, the adjusting cam 80 becomes rotatable about the support bar 81, and a height of an upper end of an outer circumferential surface, i.e., a cam surface of the adjusting cam 80 becomes movable upward and downward according to an angle of rotation of the cam 80. More specifically described, a free end portion of an adjusting jig, not shown, is engaged with the grooves 80b of the adjusting cam 80, and the jig is operated to rotate the cam 80, while a measuring jig, not shown, is used to measure the front-side clearance g2 (FIG. 3). When the measured front-side clearance g2 becomes equal to an appropriate value, the fixing screw 80a is fastened to fix the adjusting cam 80 to the support bar 81. In the first embodiment, the single adjusting cam 80 is positioned on a lengthwise middle portion of the support bar 81.

As shown in FIGS. 4A and 9A, a butting portion 83 of a lower surface of a front-end portion 82 of the recording-head unit 15 butts on the upper end of the cam surface of the adjusting cam 80, owing to the above-described downward pressing force. Thus, the carriage 10 supports the front end portion of the head unit 15 via the adjusting cam 80. More specifically described, the head unit 15 is supported by the carriage 10, such that the two portions (i.e., the left-hand and right-hand butting portions 47) of the rear-side portion of the bottom wall of the head unit 15 are supported by the two supporting portions 33 of the carriage 10 and the single portion (i.e., the butting portion 83) of the front-end portion of the head unit 15 is supported by the single adjusting cam 80 provided on the middle portion of the support bar 81. The rear-side clearance g1 is fixed because the respective positioning projections 47a (FIG. 5) of the two butting portions 47 fit in the respective receiving grooves 48 of the two supporting portions 33 and the downward pressing force is applied to the head unit 15. On the other hand, the front-side clearance g2 is adjustable because the adjusting cam 80 is rotatable and the height of the upper end of the cam surface of the cam 80 is movable upward and downward, so that the butting portion 83 of the front-end portion of the head unit 15 is movable upward and downward relative to the front-end portion of the carriage 10. Therefore, a degree of parallelism of the overall clearance G with respect to the direction of feeding of recording sheet P, i.e., an amount of difference between the rear-side clearance g1 and the front-side clearance g2 can be finely adjusted. Thus, the head unit 15 is supported by the carriage 10, i.e., the two rear-side supporting portions 33 and the single front-side supporting portion 80 as viewed from an operator in front of the printer apparatus 1, and the single front-side supporting portion 80 is provided by the single adjusting cam 80, in the first embodiment. Thus, the operator can easily gain access to the adjusting cam 80 and thereby finely adjust the degree of parallelism of the overall clearance G.

Thus, for example, when the carriage 10 per se is assembled, it is possible to adjust the adjusting cam 80 of the carriage 10 relative to a standard recording-head unit, so that when the recording-head unit 15 is actually assembled with the carriage 10, the actual head unit 15 can be naturally attached, at an accurate height, to the carriage 10. Thus, the accuracy required for the carriage 10 can be met by adjusting only the adjusting cam 80 of the carriage 10. Therefore, it is not needed to adjust the carriage 10 relative to any other component, such as the head unit 15 or the platen 25, either when or after the head unit 15 or the platen 25 is assembled with the carriage 10. Thus, the total number of steps needed to produce the printer apparatus 1 can be reduced.

Figure 10A:
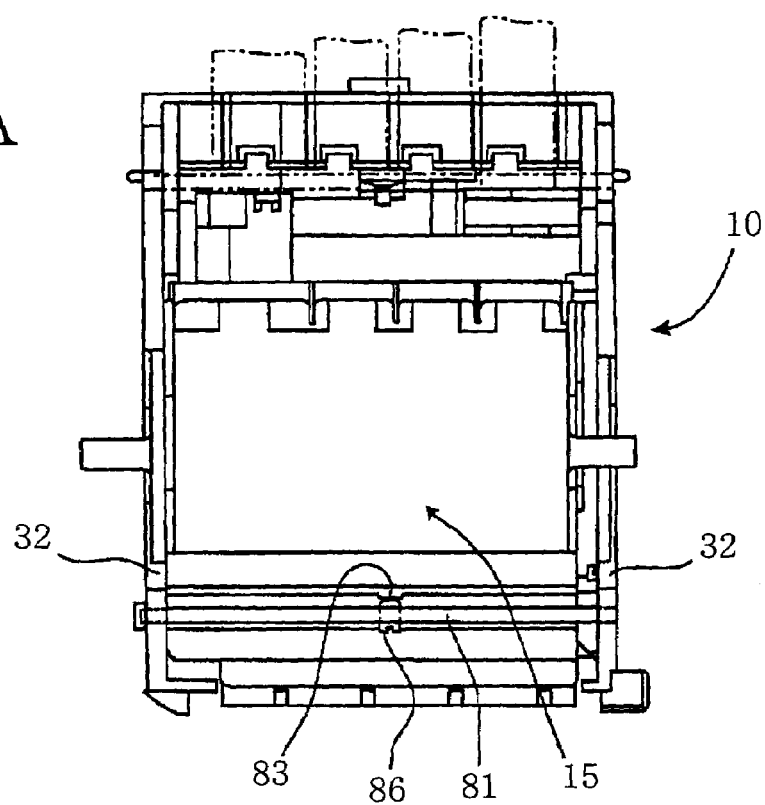
FIG. 10A is a front elevation view of the recording-head unit accommodated in a head accommodating portion of a carriage employed by a second printer apparatus in which a stopper screw is used.

FIG. 10A shows a second embodiment of the present invention. In the second embodiment, the arrangement for adjusting the clearance G is simplified by replacing the eccentric adjusting cam 80 with an adjusting screw 86 such as a set screw. In this embodiment, the support bar 81 connecting between the two side plates 32 of the carriage 10 has a screw hole formed through a thickness of a generally middle portion thereof as viewed in a lengthwise direction thereof. The adjusting screw 86 is screwed in through a lower opening of the screw hole, so that an upper end surface of the adjusting screw 86 supports the butting portion 83 of the recording-head unit 15. After the adjustment of amount of screwing of the adjusting screw 86 in the screw hole, so-call "locking" paint may be used to prevent loosening of the screw 86 or, if a space may be used, a locking nut may be used as a screw-loosening preventing member or device.

As is apparent from FIG. 10A, the carriage 10 employed in the second embodiment opens frontward and upward. Though the hold-down levers 17 are provided in the top portion of the carriage 10, the levers 17 can be pivoted upward about the lever-support bar 63, and accordingly the carriage 10 can open upward as well as frontward. Through the front and top opening of the carriage 10, the recording-head unit 15 is detachably attached to the interior space of the carriage 10. As shown in FIG. 2, in the second embodiment, too, the four ink cartridges 16 are attached to the recording-head unit 15, like a common color-image recording apparatus in which a plurality of ink cartridges are used. Therefore, a plurality of nozzles are arranged in a widthwise direction of the nozzle portion 15a of the head unit 15, i.e., in a recording direction in which the head unit 15 is moved to record an image on a recording sheet P. Hence, a third embodiment of the present invention employs an arrangement for adjusting a degree of parallelism of the clearance G with respect to not only the direction of feeding of recording sheet P but also the direction of recording of recording-head unit 15.

In the third embodiment, the head unit 15 is accurately positioned, and is stably held, in the frontward and upwardly opening, head accommodating space of the carriage 10, as follows: First, as shown in FIG. 3, the respective spring-support pins 34 projecting laterally outward from the left-hand and right-hand side plates 15c of the head unit 15 are inserted in the respective inclined recesses 35 of the left-hand and right-hand side plates 32 of the carriage 10, and then the wire springs 36 are engaged to press the head unit 15 against the carriage 10. Consequently, as shown in FIG. 5, a widthwise middle butting portion 47 provided in a rear portion of the bottom surface of the head unit 15 rests on a widthwise middle supporting portion 33 provided in a rear portion of the bottom portion of the carriage 10, while a positioning projection 47a of the single butting portion 47 fits in a receiving groove 48 of the single supporting portion 33. Therefore, the single supporting portion 33 of the rear portion of the bottom wall of the carriage 10 stably supports and holds the single butting portion 47 of the rear portion of the bottom wall of the recording-head unit 15, owing to the biasing force, i.e., downward pressing force of the wire springs 36 (FIG. 3). Thus, a rear-side clearance g1 between the nozzle portion 15a and the platen 25 is fixedly defined as described previously by reference to FIG. 3.

Next, the arrangement for positioning a front-side portion of the recording-head unit 15, i.e., adjusting a front-side clearance g2 will be explained. As shown in FIGS. 3 and 4A, a support bar 81 horizontally extends through respective through-holes formed through respective front end portions of the left-hand and right-hand side plates 32 of the carriage 10, and is fixed to the two side plates 32 with respective screws, not shown.

Figure 8B:
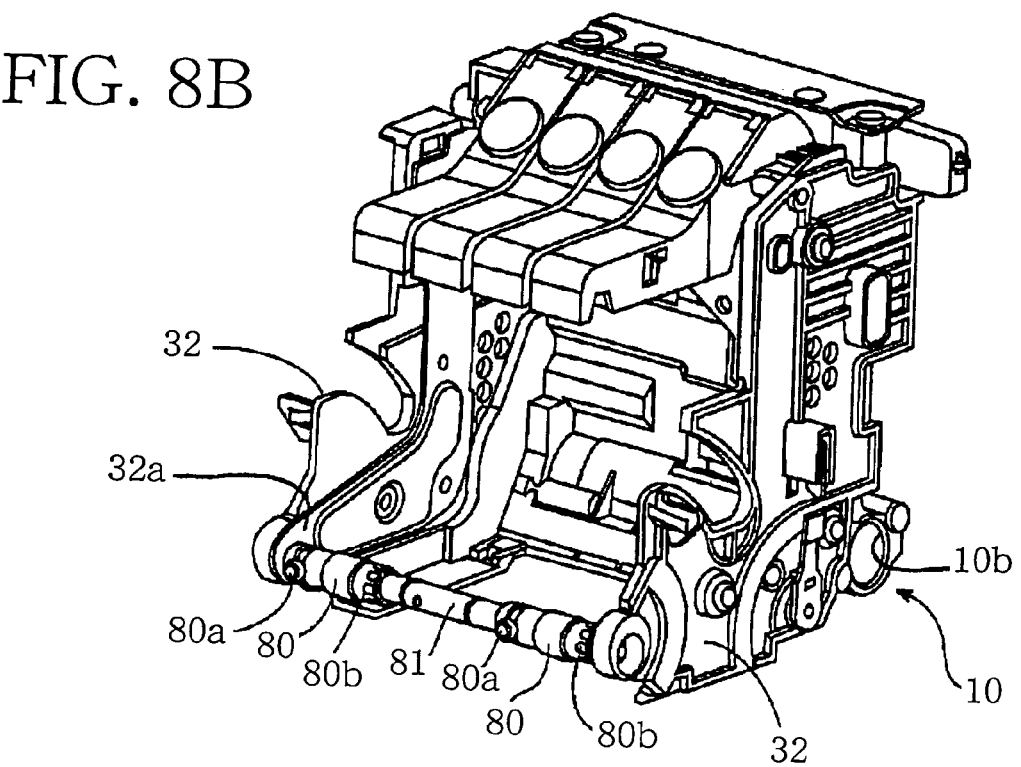
FIG. 8B is a perspective view of a modified form of the clearance adjusting device.

In addition, as shown in FIG. 8B, two reinforcing plates 32a which are formed of, e.g., metal and have a high degree of rigidity are respectively fixed to the left-hand and right-hand side plates 32 with respective screws, not shown. Since the side plates 32 are formed of synthetic resin, the reinforcing plates 32a compensate for the shortage of rigidity of the side plates 32 so that the side plates 32 can support the support bar 81.

Figure 9B:
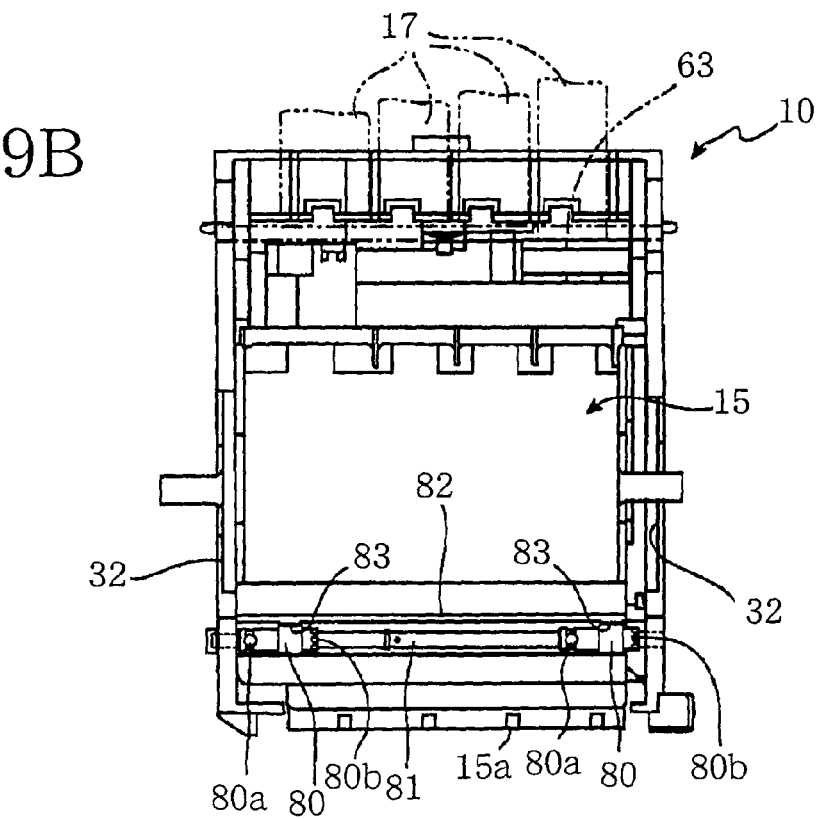
FIG. 9B is a front elevation view of the recording-head unit accommodated in a head accommodating portion of a modified form of the carriage.

As shown in FIGS. 4A, 8B and 9B, the support bar 81 connecting between the two side plates 32 of the carriage 10 supports two eccentric adjusting cams 80 such that the eccentric adjusting cams 80 are eccentric with the bar 81. The eccentric adjusting cams 80 are fixed to the support bar 81 with respective fixing screws 80a such as set screws. Each adjusting cam 80 has, in one of axially opposite end portions thereof, a plurality of grooves 80b. If each fixing screw 80a is loosened, the corresponding adjusting cam 80 becomes rotatable about the support bar 81, and a height of an upper end of an outer circumferential surface, i.e., a cam surface of the adjusting cam 80 becomes movable upward and downward according to an angle of rotation of the cam 80. More specifically described, a free end portion of an adjusting jig, not shown, is engaged with the grooves 80b of each adjusting cam 80, and the jig is operated to rotate the each cam 80, while a measuring jig, not shown, is used to measure the front-side clearance g2 (FIG. 3). When the measured front-side clearance g2 becomes equal to an appropriate value, the fixing screws 80a are fastened to fix the adjusting cams 80 to the support bar 81. In the third embodiment, the two adjusting cams 80 are positioned on lengthwise opposite end portions of the support bar 81, respectively.

As shown in FIGS. 4A and 9B, left-hand and right-hand butting portions 83 of a lower surface of a front-end portion 82 of the recording-head unit 15 butt on the respective upper ends of the respective cam surfaces of the two adjusting cams 80, owing to the above-described downward pressing force. Thus, the carriage 10 supports the front end portion of the head unit 15 via the adjusting cams 80. More specifically described, the head unit 15 is supported by the carriage 10, such that the single portion (i.e., the widthwise middle butting portion 47) of the rear-side portion of the bottom wall of the head unit 15 is supported by the single supporting portion 33 of the carriage 10 and the two portions (i.e., the left-hand and right-hand butting portions 83) of the front-end portion of the head unit 15 are supported by the two adjusting cams 80 provided on the lengthwise opposite end portions of the support bar 81. The rear-side clearance g1 is fixed because the positioning projection 47a (FIG. 5) of the single butting portion 47 fits in the receiving groove 48 of the single supporting portion 33 and the downward pressing force is applied to the head unit 15. On the other hand, the front-side clearance g2 is adjustable because the two adjusting cams 80 are rotatable and the respective heights of the respective upper ends of the respective cam surfaces of the two cams 80 are movable upward and downward, so that the two butting portions 83 of the front-end portion of the head unit 15 are movable upward and downward relative to the corresponding two portions of the front-end portion of the carriage 10. Therefore, a degree of parallelism of the overall clearance G with respect to the direction of feeding of recording sheet P, i.e., an amount of difference between the rear-side clearance g1 and the front-side clearance g2 can be finely adjusted at each of the two (i.e., left-hand and right-hand) portions of the front-end portion of the carriage 10. Thus, the head unit 15 is supported by the carriage 10, i.e., the single rear-side supporting portion 33 and the two front-side supporting portions 80 as viewed from an operator in front of the printer apparatus 1, and the two front-side supporting portions 80 are provided by the two adjusting cams 80, in the third embodiment. Thus, the operator can easily gain access to each of the adjusting cams 80 and thereby finely adjust the degree of parallelism of the overall clearance G at each of the left-hand and right-hand portions of the front-end portion of the carriage 10.

Figure 10B:
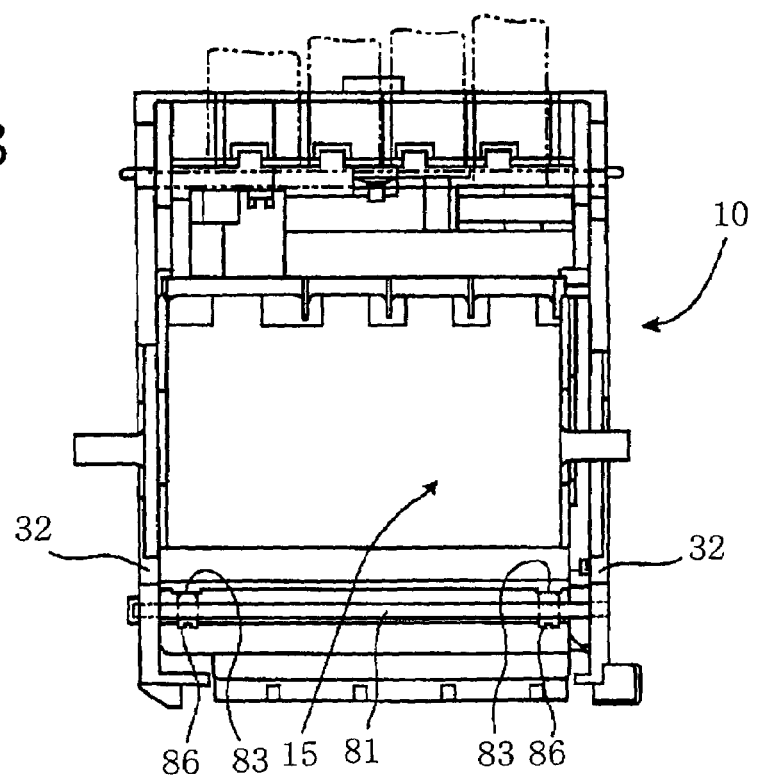
FIG. 10B is a front elevation view of the recording-head unit accommodated in a head accommodating portion of a modified form of the carriage employed by the second printer apparatus in which the stopper screw is used.

FIG. 10B shows a fourth embodiment of the present invention. In the fourth embodiment, the arrangement for adjusting the clearance G is simplified by replacing the two eccentric adjusting cams 80 with two adjusting screws 86 such as set screws. In this embodiment, the support bar 81 connecting between the two side plates 32 of the carriage 10 has two screw holes formed through a thickness of lengthwise opposite end portions thereof. The two adjusting screws 86 is screwed in through respective lower openings of the two screw holes, so that respective upper end surfaces of the adjusting screw 86 support the respective butting portions 83 of the recording-head unit 15. After the adjustment of amount of screwing of each of the adjusting screws 86 in the corresponding screw hole, so-call "locking" paint may be used to prevent loosening of the screws 86 or, if spaces may be used, respective locking nuts may be used as screw-loosening preventing members or devices.

In each of the first and third embodiments, one or two adjusting cams 80 shown in FIGS. 8A and 8B is or are rotated, using the adjusting jig (not shown), about the support bar 81, so that the angular position or positions of the adjusting cam or cams 80 relative to the support bar 81 is or are adjusted. This adjusting method suffers no problem so long as it is carried out when the printer apparatus 1 is assembled. However, when the adjusting jig is not readily available after the assembling, for example, when the printer apparatus 1 is subjected to re-adjustment after the assembling, to maintenance check, or to part replacement, it may be not easy to carry out the adjusting method. Next, there will be described a fifth embodiment which does not require no special jig and enjoys the same advantages as those of the first and third embodiments.

Figure 4B:
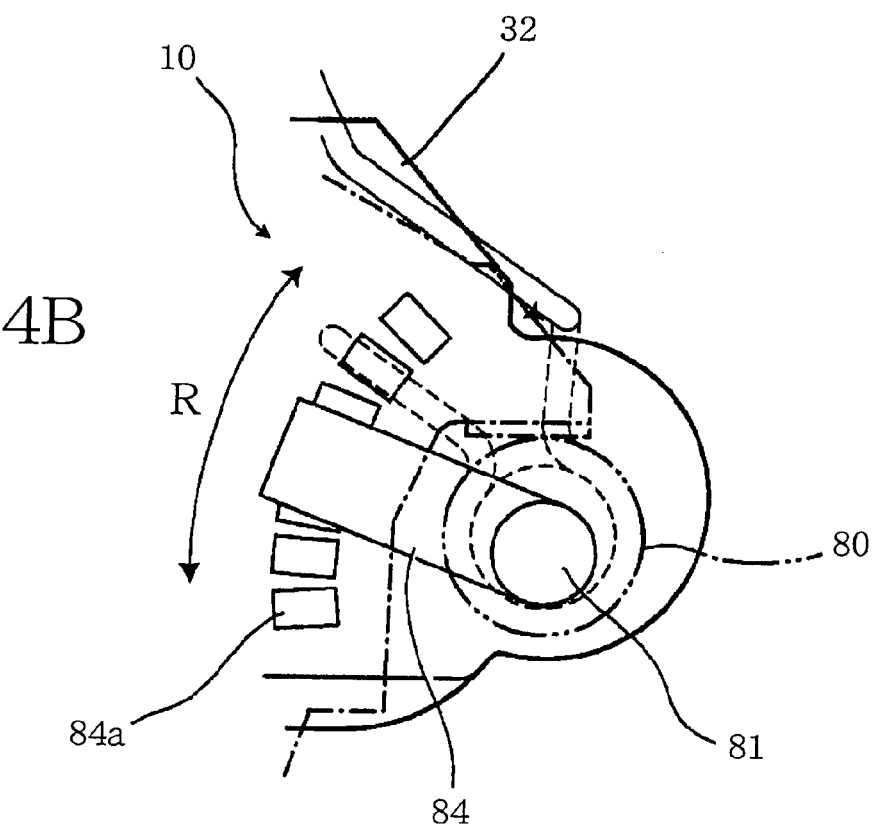
FIG. 4B is an enlarged view of a modified form of the portion indicated at "A" in FIG. 3.

As shown in FIGS. 3 and 4B, a support bar 81 horizontally extends through respective through-holes formed through respective front end portions of the left-hand and right-hand side plates 32 of the carriage 10, and screws, set pins, or stop rings, not shown, are used to secure the support bar 81 to the side plates 32 such that the support bar 81 does not come off the side plates 32 and is rotatable about its own axis line. As shown in FIG. 4B, one of opposite end portions of the support bar 81 extends through, and projects outward from, the corresponding one of the two side plates 32, and an adjusting lever 84 is fixed to the projecting end portion of the support bar 81. Thus, the adjusting lever 84 is rotatable with the support bar 81, in a direction, R, shown in the figure. The adjusting lever 84 has an appropriate degree of elasticity, and has a protrusion, not shown, formed in an inner surface thereof. The one side plate 32 has a plurality of stopping grooves 84a formed in an outer surface thereof. Thus, the protrusion of the adjusting lever 84 fits in one of the stopping grooves 84a, so that the adjusting lever 84 is stopped at an appropriate position relative to the one side plate 32. In this state, the support bar 81 is prevented from being rotated about its own axis line and is kept fixed.

Thus, in the fifth embodiment shown in FIG. 4A, one or two adjusting cams 80 is or are adjustable with respect to angular position, not only independent of the support bar 81 as described above in connection with the first and third embodiments, but also dependent on, i.e., together with the support bar 81 using the adjusting lever 84 that is rotatable in the direction R. In the third embodiment shown in FIG. 8B, the two adjusting cams 80 are simultaneously adjusted by the rotation of the adjusting lever 84. Therefore, it is advantageous to cause the adjusting lever 84 to fit in an appropriate one (e.g., a middle one) of the stopping grooves 84a and, in this state, rotate the one or two adjusting cams 80 to adjust the front-side clearance g2 as described above with the first and third embodiments. In this case, when re-adjustment of the clearance g2 is needed, the re-adjustment can be carried out by just rotating the adjusting lever 84. In addition, when the printer apparatus 1 is subjected to maintenance check, it is not needed to disassemble the carriage 10 into fine parts. Thus, the adjusting lever 84 and the stopping grooves 84 cooperate with each other to provide a useful clearance adjusting device.

The present invention can be widely applied to all sorts of carriages that carry recording heads, and those recording heads are not limited to the above-described ink jet recording heads but may be other sorts of recording heads. In addition, the present invention can be applied to not only the printer apparatuses but also copying machines and image scanners.

While the present invention has been described in detail in its embodiments, it is to be understood that the present invention is not limited to the details of those embodiments and may be embodied with various changes and improvements, such as those described in SUMMARY OF THE INVENTION, which may occur to a person skilled in the art.

What is claimed is:

1. A carriage for supporting a recording head having a recording surface in which at least one nozzle opens, the carriage being reciprocated in a reciprocating direction intersecting a feeding direction in which a recording medium is fed, the carriage comprising:
   a main body;
   a plurality of supporting portions having respective supporting points where the supporting portions engage and support the recording head; and
   at least one adjusting device which moves, relative to the main body, the supporting point of at least one first supporting portion of the supporting portions in a moving direction substantially perpendicular to the recording surface of the recording head, without moving the supporting point of at least one second supporting portion of the supporting portions.

2. The carriage according to claim 1, wherein the supporting portions comprise two upstream supporting portions as two said second supporting portions and one downstream supporting portion as said at least one first supporting portion with respect to the feeding direction, and wherein said at least one adjusting device moves the supporting point of the downstream supporting portion in the moving direction.

3. The carriage according to claim 1, wherein the supporting portions comprise one upstream supporting portion as said at least one second supporting portion and two downstream supporting portions as two said first supporting portions with respect to the feeding direction, and wherein the carriage comprises two said adjusting devices which move the respective supporting points of the two downstream supporting portions in the moving direction.

4. The carriage according to claim 3, wherein the two adjusting devices simultaneously move the respective supporting points of the two downstream supporting portions in the moving direction.

5. The carriage according to claim 1, wherein the carriage has a head accommodating space which accommodates the recording head such that the head is detachable from the carriage and which opens toward a front side of the carriage, and wherein the supporting portions comprise at least one front supporting portion provided in the space, near to the front side of the carriage, and at least one rear supporting portion provided in the space, remote from the front side of the carriage.

6. The carriage according to claim 1, wherein the carriage comprises a plurality of said adjusting devices which move, independent of each other, the respective supporting points of a plurality of said first supporting portions in the moving direction.

7. The carriage according to claim 1, wherein said at least one adjusting device adjusts a height position of the supporting point of said at least one first supporting portion.

8. The carriage according to claim 7, wherein said at least one adjusting device comprises a cam which is for adjusting the height position of the supporting point of said at least one first supporting portion where said at least one first supporting portion engages and supports the recording head.

9. The carriage according to claim 7, wherein said at least one adjusting device comprises a screw which is rotatable for adjusting the height position of the supporting point of said at least one first supporting portion where said at least one first supporting portion engages and supports the recording head.

10. The carriage according to claim 1, wherein the recording head has a plurality of said nozzles which open in the recording surface and are arranged in the feeding direction, wherein said at least one adjusting device moves, relative to the main body, the supporting point of said at least one first supporting portion in the moving direction, without moving the supporting point of said at least one second supporting portion, and thereby rotates the recording head relative to the main body about an axis line passing through the supporting point of said at least one second supporting portion, so as to change an angle of the recording surface of the recording head relative to the feeding direction and thereby adjust a degree of parallelism between the recording surface of the recording head and the recording medium with respect to the feeding direction.

11. The carriage according to claim 10, wherein the recording head comprises a plurality of supported portions which are supported by the plurality of supporting portions of the carriage, respectively, and wherein the axis line is substantially perpendicular to the feeding direction.

12. The carriage according to claim 1, wherein the recording head is detachably attached to the carriage such that a lower surface of the recording head is supported by the plurality of supporting portions of the carriage.

13. A carriage for supporting a recording head having a recording surface in which a plurality of nozzles open, such that a clearance is present between the recording surface of the recording head supported by the carriage, and a recording medium, the carriage being reciprocated in a reciprocating direction intersecting a feeding direction in which the recording medium is fed and the nozzles of the recording head are arranged, the carriage comprising:

a main body;

a plurality of supporting portions having respective supporting points where the supporting portions engage and support the recording head; and at least one adjusting device which moves, relative to the main body, the supporting point of at least one adjustable supporting portion of the supporting portions in a moving direction substantially perpendicular to the recording surface of the recording head, the supporting portions further comprising at least one stationary supporting portion whose supporting point is stationary, said at least one adjustable supporting portion being provided at a downstream position in the feeding direction so as to define a downstream clearance between a downstream portion of the recording head and the recording medium, said at least one stationary supporting portion being provided at an upstream position in the feeding direction so as to define an upstream clearance between an upstream portion of the recording head and the recording medium, said at least one adjusting device moving the supporting point of said at least one adjustable supporting portion and thereby adjusting the downstream clearance between the downstream portion of the recording head and the recording medium.

14. The carriage according to claim 13, further comprising:

two side plates which extend perpendicularly to the reciprocating direction and cooperate with each other to define a head accommodating space to accommodate the recording head; and a support bar which extends, at the downstream position in the feeding direction, perpendicularly to the two side plates and has opposite end portions that are respectively supported by the two side plates, wherein the support bar supports said at least one adjustable supporting portion and said at least one adjusting device which moves the supporting point of said at least one adjustable supporting portion and thereby adjusts the downstream clearance between the downstream portion of the recording head and the recording medium.

15. The carriage according to claim 14, further comprising two reinforcing plates which are fixed to the two side plates, respectively, and cooperate with each other to support the support bar.

16. The carriage according to claim 14, wherein said at least one adjusting device comprises a cam which is supported by the support bar, and wherein the supporting point of said at least one adjustable supporting portion comprises an outer circumferential surface of the cam.

17. The carriage according to claim 14, wherein said at least one adjusting device comprises a screw which is screwed in a hole of the support bar such that the screw is movable in the hole of the support bar, and wherein the supporting point of said at least one adjustable supporting portion comprises an end surface of the screw.

18. The carriage according to claim 13, wherein the carriage comprises two upstream supporting portions as two said stationary supporting portions and one downstream supporting portion as said at least one adjustable supporting portion with respect to the feeding direction.

19. The carriage according to claim 18, wherein the two upstream stationary supporting portions are provided in vicinity of the two side plates, respectively, and the one downstream adjustable supporting portion is provided at a substantially middle position between the two side plates.

20. The carriage according to claim 13, wherein the carriage comprises one upstream supporting portion as said at least one stationary supporting portion and two downstream supporting portions as two said adjustable supporting portions with respect to the feeding direction.

21. The carriage according to claim 20, wherein the one upstream stationary supporting portion is provided at a substantially middle position between the two side plates, and the two downstream adjustable supporting portions are provided in vicinity of the two side plates, respectively.

22. A carriage for supporting a recording head having a recording surface in which a plurality of nozzles open, such that a clearance is present between the recording surface of the recording head supported by the carriage, and a recording medium, the carriage being reciprocated along a guide bar in a reciprocating direction intersecting a feeding direction in which the recording medium is fed and the nozzles of the recording head are arranged, the carriage comprising:

a main body having at least one through-hole through which the guide bar extends;

a plurality of supporting portions having respective supporting points where the supporting portions engage and support the recording head, and comprising at least one hole-side supporting portion provided on a side of said at least one through-hole and at least one opposite-side supporting portion that is opposite to said at least one hole-side supporting portion with respect to the recording head; and at least one adjusting device which moves, relative to the main body, the supporting point of at least one first supporting portion of the supporting portions in a moving direction substantially perpendicular to the recording surface of the recording head, without moving the supporting point of at least one second supporting portion of the supporting portions.

23. The carriage according to claim 22, wherein the supporting portions comprise two said hole-side supporting portions provided on the side of said at least one through-hole, and said one opposite-side supporting portion opposite to the two hole-side supporting portions with respect to the recording head, and wherein said at least one adjusting device moves the supporting point of the one opposite-side supporting portion as said at least one first supporting portion in the moving direction.

24. The carriage according to claim 22, wherein the supporting portions comprise said one hole-side supporting portion provided on the side of said at least one through-hole, and two said opposite-side supporting portions opposite to the one hole-side supporting portion with respect to the recording head, and wherein the carriage comprises two said adjusting devices which move the respective supporting points of the two opposite-side supporting portions in the moving direction.

25. An image recording apparatus, comprising:

a recording head which records an image on a recoding medium and which has a recording surface in which a plurality of nozzles open;

a carriage which supports the recording head and which is reciprocated in a reciprocating direction intersecting a feeding direction in which the recording medium is fed and the nozzles of the recording head are arranged, the carriage comprising:

a main body;

a plurality of supporting portions having respective supporting points where the supporting portions engage and support the recording head, and at least one adjusting device which moves, relative to the main body, the supporting point of at least one first supporting portion of the supporting portions in a moving direction substantially perpendicular to the recording surface of the recording head, without moving the supporting point of at least one second supporting portion of the supporting portions;

a guide bar which guides the carriage such that the carriage is reciprocated in the reciprocating direction; and a frame which holds the guide bar, supports the carriage, and cooperates with the guide bar to position the carriage relative to the recording medium.

26. The image recording apparatus according to claim 25, wherein the carriage supports the recording head comprising an ink jet recording head which outputs, from each of the nozzles thereof, an ink toward the recording medium to record an image on the recording medium.

* * * * *